(12) United States Patent
Leahy et al.

(10) Patent No.: US 9,745,056 B2
(45) Date of Patent: Aug. 29, 2017

(54) MAIN ROTOR BLADE WITH COMPOSITE INTEGRAL SKIN AND CUFF

(71) Applicant: Sikorsky Aircraft Corporation, Stratford, CT (US)

(72) Inventors: Kevin P. Leahy, Naugatuck, CT (US); Richard Joseph Simkulak, Meriden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1143 days.

(21) Appl. No.: 13/894,046

(22) Filed: May 14, 2013

(65) Prior Publication Data
US 2014/0341746 A1   Nov. 20, 2014

(51) Int. Cl.
*B64C 27/473*   (2006.01)
*B23P 15/04*   (2006.01)
*B64C 27/46*   (2006.01)

(52) U.S. Cl.
CPC .......... *B64C 27/473* (2013.01); *B64C 27/463* (2013.01); *Y10T 29/49337* (2015.01)

(58) Field of Classification Search
CPC ................ B64C 27/463; B64C 27/473; B63C 2027/4736; B23P 15/04; Y10T 29/49337
See application file for complete search history.

(56) References Cited

U.S. PATENT DOCUMENTS

| | | | |
|---|---|---|---|
| 4,247,255 A | 1/1981 | De Rosa | |
| 4,601,639 A | 7/1986 | Yen et al. | |
| 5,346,367 A | 9/1994 | Doolin et al. | |
| 5,430,937 A * | 7/1995 | Leahy | B29C 70/446 29/706 |
| 5,454,693 A | 10/1995 | Aubry et al. | |
| 5,462,408 A | 10/1995 | Coffy | |
| 5,645,400 A | 7/1997 | Hunter et al. | |
| 5,832,605 A * | 11/1998 | Leahy | B29C 70/38 29/23.51 |
| 5,836,062 A * | 11/1998 | Leahy | B29D 99/0028 29/23.51 |
| 5,862,576 A * | 1/1999 | Leahy | B29D 99/0028 29/23.51 |
| 6,659,722 B2 * | 12/2003 | Sehgal | B64C 27/473 416/134 A |
| 6,976,829 B2 * | 12/2005 | Kovalsky | B64C 27/46 416/226 |

(Continued)

*Primary Examiner* — Igor Kershteyn
(74) *Attorney, Agent, or Firm* — Cantor Colburn LLP (57) ABSTRACT

A main rotor blade assembly is provided including a spar which comprises a main section. A main core is positioned adjacent a trailing side of the main section of the spar. A tip assembly includes a main tip core and a tip end pocket core. The tip assembly is positioned adjacent an outboard end of the main core and the spar such that the main tip core is substantially aligned with a longitudinal axis of the main core and the tip end pocket core is substantially aligned with a longitudinal axis of the spar. At least a portion of both the main tip core and the tip end pocket core comprises a high density core. An upper composite skin and a lower composite skin extend over the spar, the main core, the main tip core, and the tip end pocket core. A portion of the upper composite skin and the lower composite skin has a thickness sufficient to be load bearing.

23 Claims, 6 Drawing Sheets

(56) References Cited

U.S. PATENT DOCUMENTS

| | | | |
|---|---|---|---|
| 7,165,945 B2 * | 1/2007 | Kovalsky | B29C 70/222 |
| | | | 416/226 |
| 7,811,061 B2 | 10/2010 | Bianchi et al. | |
| 7,972,114 B2 | 7/2011 | Gupta et al. | |
| 8,353,673 B2 | 1/2013 | Leahy et al. | |
| 2009/0148303 A1 * | 6/2009 | Leahy | B64C 27/463 |
| | | | 416/226 |
| 2009/0269205 A1 * | 10/2009 | Leahy | B64C 27/463 |
| | | | 416/226 |
| 2011/0211968 A1 * | 9/2011 | Simkulak | B64C 27/463 |
| | | | 416/226 |

* cited by examiner

MAIN ROTOR BLADE WITH COMPOSITE INTEGRAL SKIN AND CUFF

STATEMENT REGARDING FEDERALLY SPONSORED RESEARCH OR DEVELOPMENT

This invention was made with government support under contract no. N00019-06-C-0081 awarded by the Department of the Navy. The government has certain rights in the invention.

BACKGROUND OF THE INVENTION

Exemplary embodiments of the invention relate to a rotary-wing aircraft and, more particularly, to a main rotor blade of a rotary-wing aircraft.

Rotary-wing aircraft blades often include a composite or metallic main rotor spar of a constant chord and constant wall thickness. To attach the rotor spar to a hub assembly, a separate root end cuff is attached to an inboard section of the main rotor spar. The cuff is conventionally manufactured of a titanium forging or a composite root laminate sized to match an outer mold line of the main rotor spar. The root end cuff is attached to the main rotor spar through a multiple fastener configuration, each fastener of which must be torqued to a required standard. At the outboard side of the blade, the blade terminates at a tip cap which is non-structural in nature. As such, additional lift is not available from the spar through the tip cap since this portion of the blade does not generate lift.

Although effective, the separate root end cuff assembly and related hub componentry may result in a weight and life cycle penalty as the multiple of components are duplicated on each rotor blade assembly.

BRIEF DESCRIPTION OF THE INVENTION

According to one embodiment of the invention, a main rotor blade assembly is provided including a spar which comprises a main section. A main core is positioned adjacent a trailing side of the main section of the spar. A tip assembly includes a main tip core and a tip end pocket core. The tip assembly is positioned adjacent an outboard end of the main core and the spar such that the main tip core is substantially aligned with a longitudinal axis of the main core and the tip end pocket core is substantially aligned with a longitudinal axis of the spar. At least a portion of both the main tip core and the tip end pocket core comprises a high density core. An upper composite skin and a lower composite skin extend over the spar, the main core, the main tip core, and the tip end pocket core. A portion of the upper composite skin and the lower composite skin has a thickness sufficient to be load bearing.

According to another embodiment of the invention, a method of assembling a main rotor blade is provided comprising forming a main core, main tip core, and tip end pocket core. An upper skin and a lower skin are connected to the main core, main tip core, and tip end pocket core. The main core, main tip core, and tip end pocket core are machined to a desired size and shape. The upper skin, lower skin, main core, main tip core, and tip end pocket core are positioned adjacent a rigid spar.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
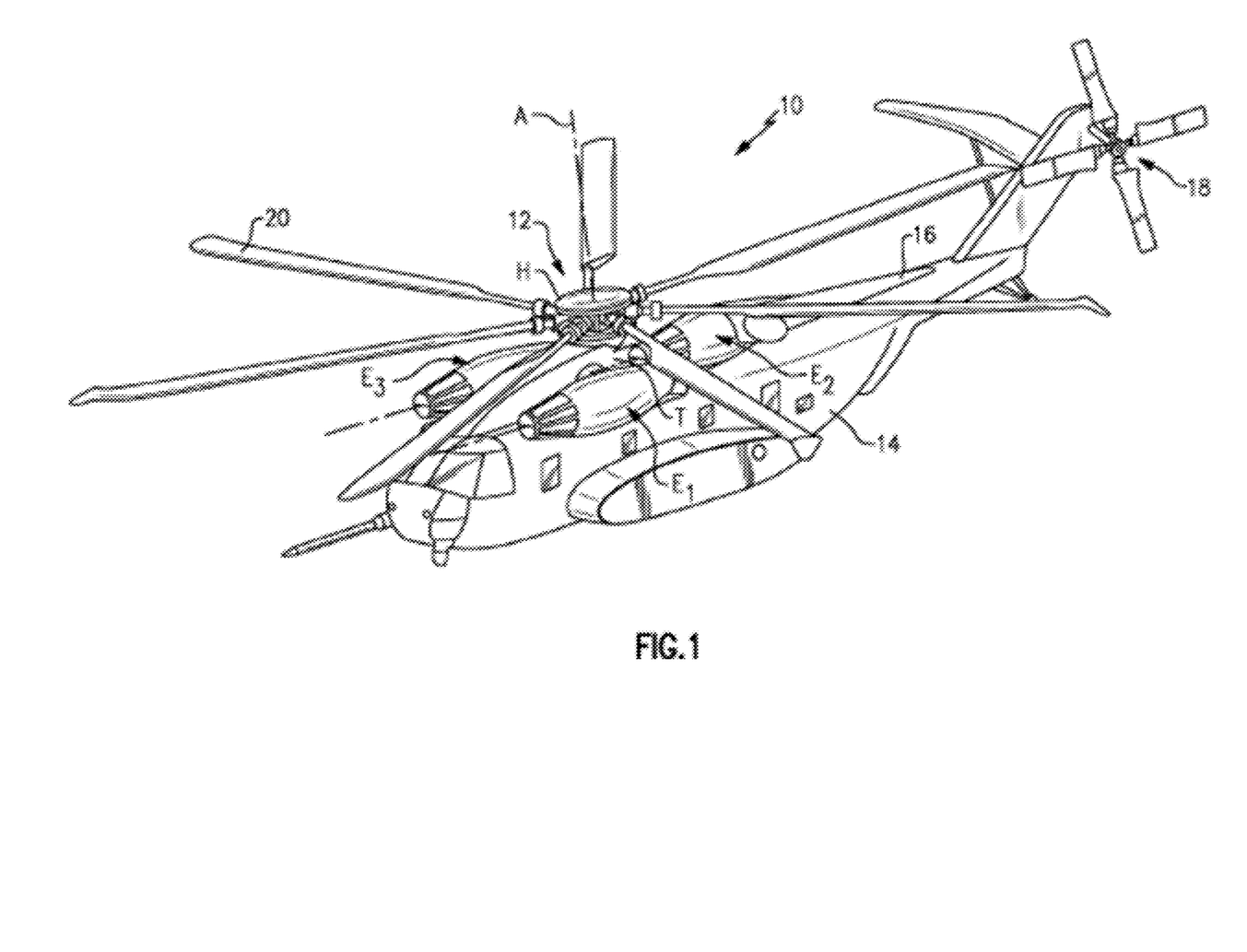
FIG. 1 is a perspective view of an exemplary rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircrafts with supplemental translational thrust systems, dual contra-rotating, coaxial rotor system aircraft, turbo-props, tilt-rotors, and tilt-wing aircrafts are also within the scope of the invention.

Figures 2A, 2B:
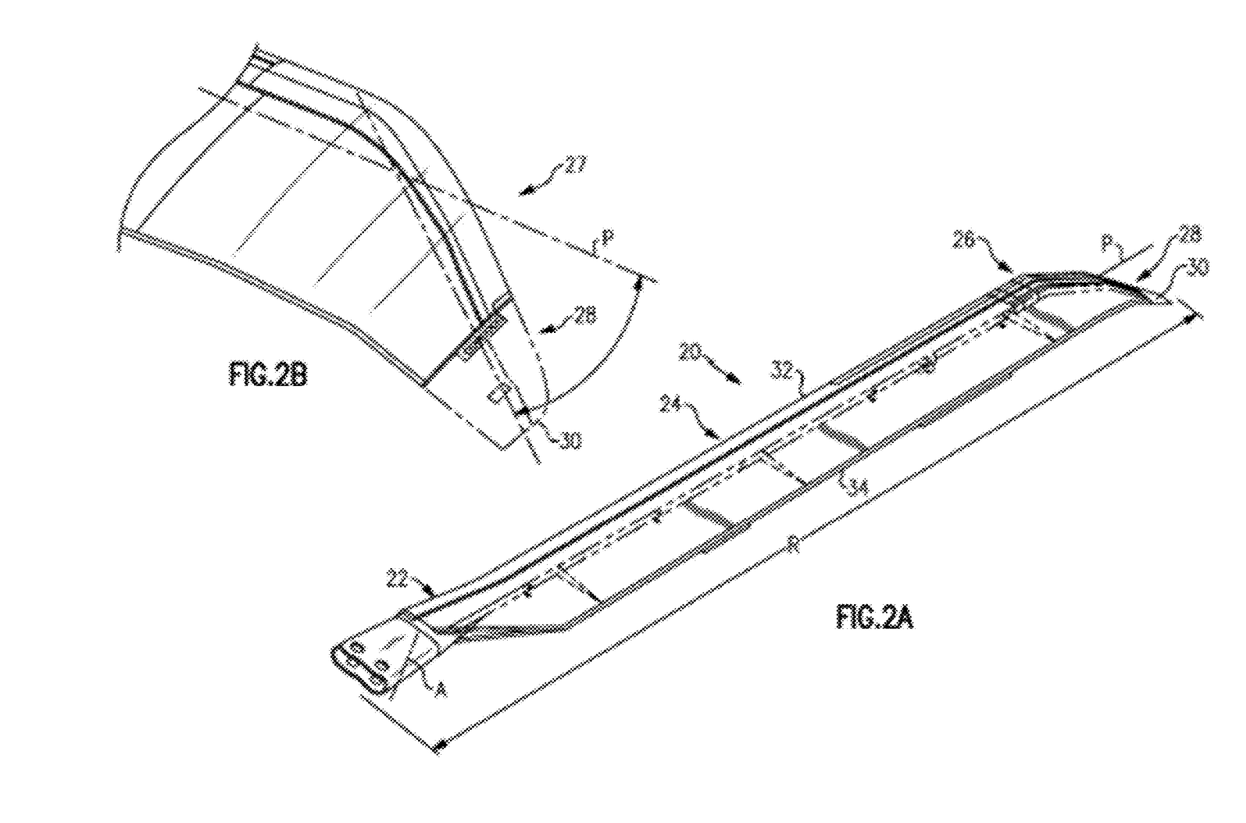
FIG. 2A is a perspective view of a main rotor blade according to an embodiment of the invention.
FIG. 2B is an expanded perspective view of a tip section of the rotor blade of FIG. 2A.
Figure 2C:
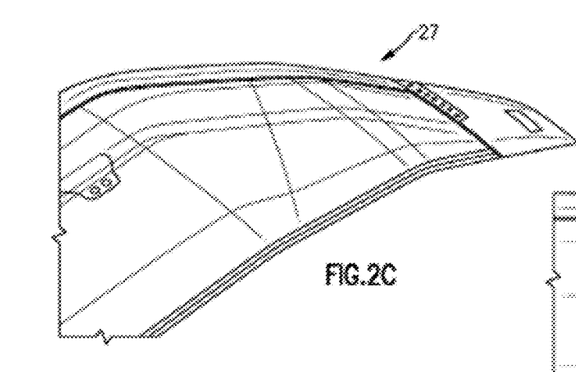
FIG. 2C is an expanded rear oblique perspective view of a tip section of the rotor blade of FIG. 2A.
Figure 2D:
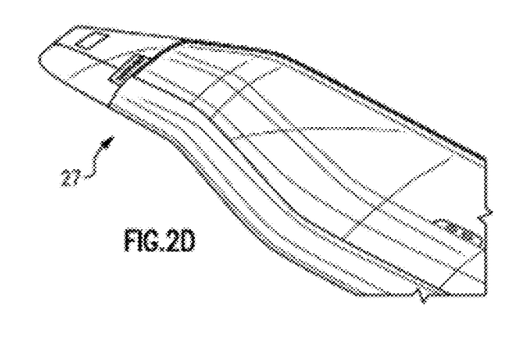
FIG. 2D is an expanded front oblique perspective view of a tip section of the rotor blade of FIG. 2A.
Figure 2E:
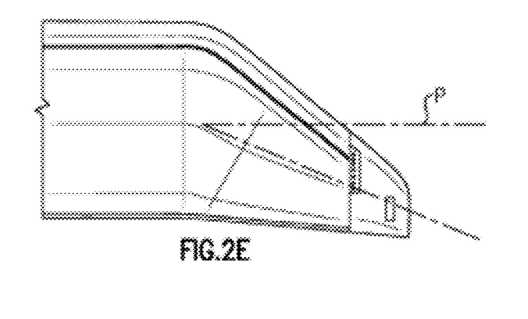
FIG. 2E is an expanded top view of a top section of the rotor blade of FIG. 2A.
Figure 2F:
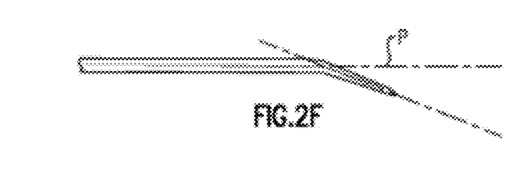
FIG. 2F is an expanded front view of a tip section of the rotor blade of FIG. 2A.

Referring to FIG. 2A, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form 27 (FIGS. 2B-2F); however, any angled or non-angles forms such as cathedral, gull, bent, and other non-straight forms are within the scope of the present invention. The anhedral form 27 as defined herein may include a rotor blade tip section 26 which extends at least partially out of a plane defined by the intermediate section 24

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm.

Figure 3:
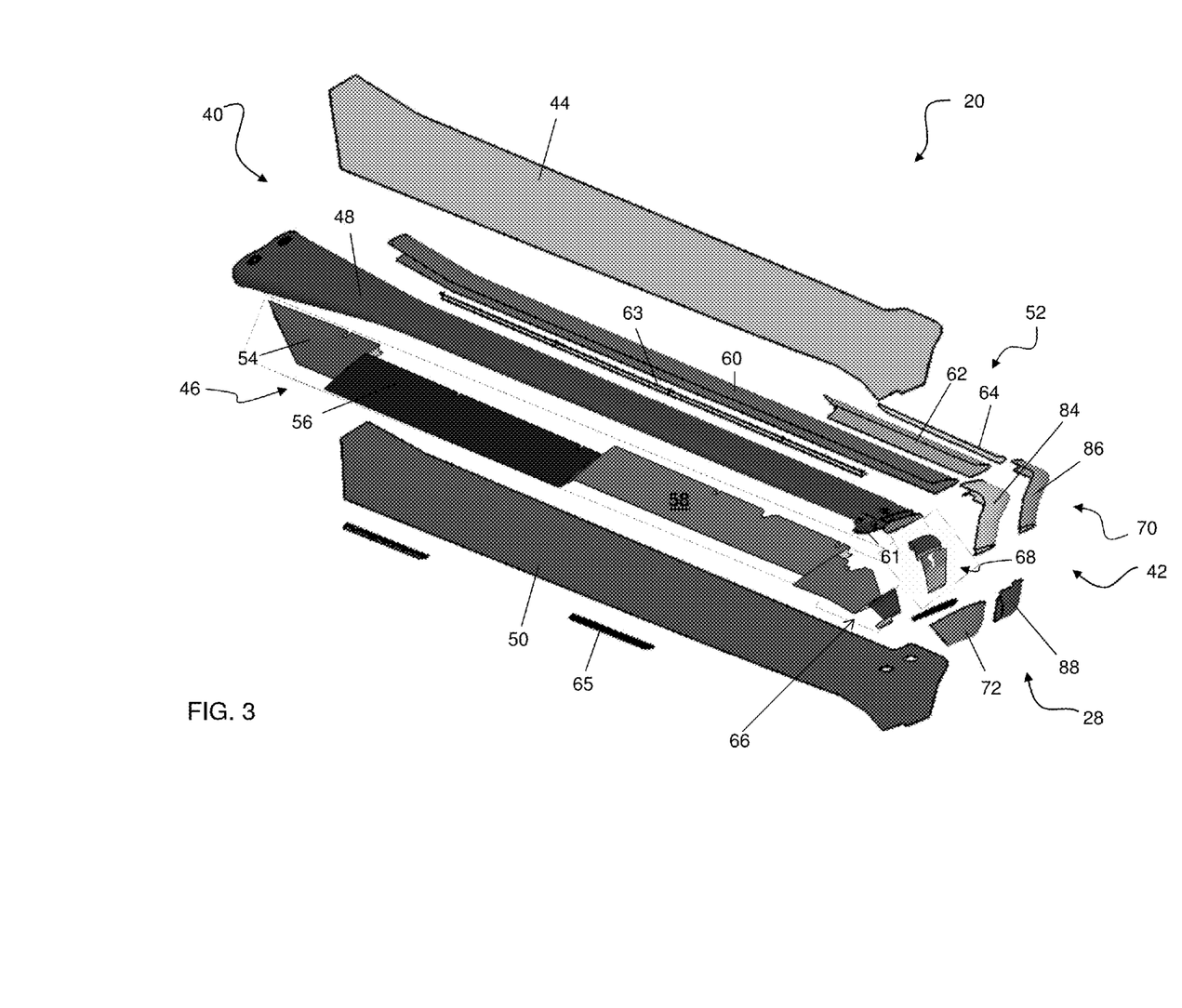
FIG. 3 is a perspective, exploded view of a main rotor blade according to an embodiment of the invention.

Referring now to FIG. 3, the rotor blade assembly 20 generally includes a main blade assembly 40 and a tip assembly 42. The main blade assembly 40 includes an upper skin 44, a main core 46, a spar 48, a lower skin 50, and a leading edge assembly 52. The main spar 48, main core 46, and skins 44, 50 are generally referred to as a pocket assembly, the forward portion of which is closed out by the leading edge assembly 52. The spar 48 has a generally constant thickness over most of its length. In one embodiment, the root end of the spar 48 has a substantially increased size, thickness, and/or strength to allow for the attachment of the blade 20 to a rotor hub, such as rotor hub H for example, without the need for a separate composite or metallic cuff and other associated attachment hardware.

The main core 46 may be formed from a plurality of separate core pieces, each of which may be fabricated from a distinct core material to provide particular lift and strength properties. Exemplary core materials include but are not limited to hexagonal cell honeycomb core. A first piece 54 of the main core 46 is generally arranged near the inboard end of the spar 48. In one embodiment, the first piece 54 is formed from a polyamide honeycomb core having a medium density in the range of about 2.1 pounds per cubic foot to about 5.0 pounds per cubic foot. A second piece and third piece 56, 58 of the main core 46 are configured to contact a central portion of the spar 48 to form the intermediate section of the blade 20. In one embodiment, the second and third pieces 56, 58 are formed from a polyamide honeycomb core having a low density in the range of about 1.0 pounds per cubic foot to about 2.0 pounds per cubic foot.

The leading edge assembly 52 generally includes a main sheath laminate 60 upon which is mounted a wear-resistant material, such as a titanium erosion strip 62 and a nickel erosion strip 64 for example, to provide abrasion protection. Alternatively, the sheath laminate 60 may include a single erosion strip (not shown), for example manufactured from AM355, which replaces the titanium erosion strip 62 and the nickel erosion strip 64. It should be understood that a variety of wear-resistant materials may alternatively or additionally be provided for the leading edge assembly. Additional structures, such as weight cups 61, leading edge counter weights 63, and trim tab systems 65 for example, may also be provided, in a manner known to a person having ordinary skill in the art. The tip assembly 42 generally includes a main tip core 66, a tip end pocket core 68, a tip leading edge assembly 70, and a tip cap 28. The main tip core 66 is substantially aligned with a longitudinal axis of the main core 46 and is positioned directly adjacent the third piece 58 of the main core 46. In one embodiment, the main tip core 66 includes a plurality of core pieces, such as three tip core pieces for example, each having a specific core density.

Figure 4:
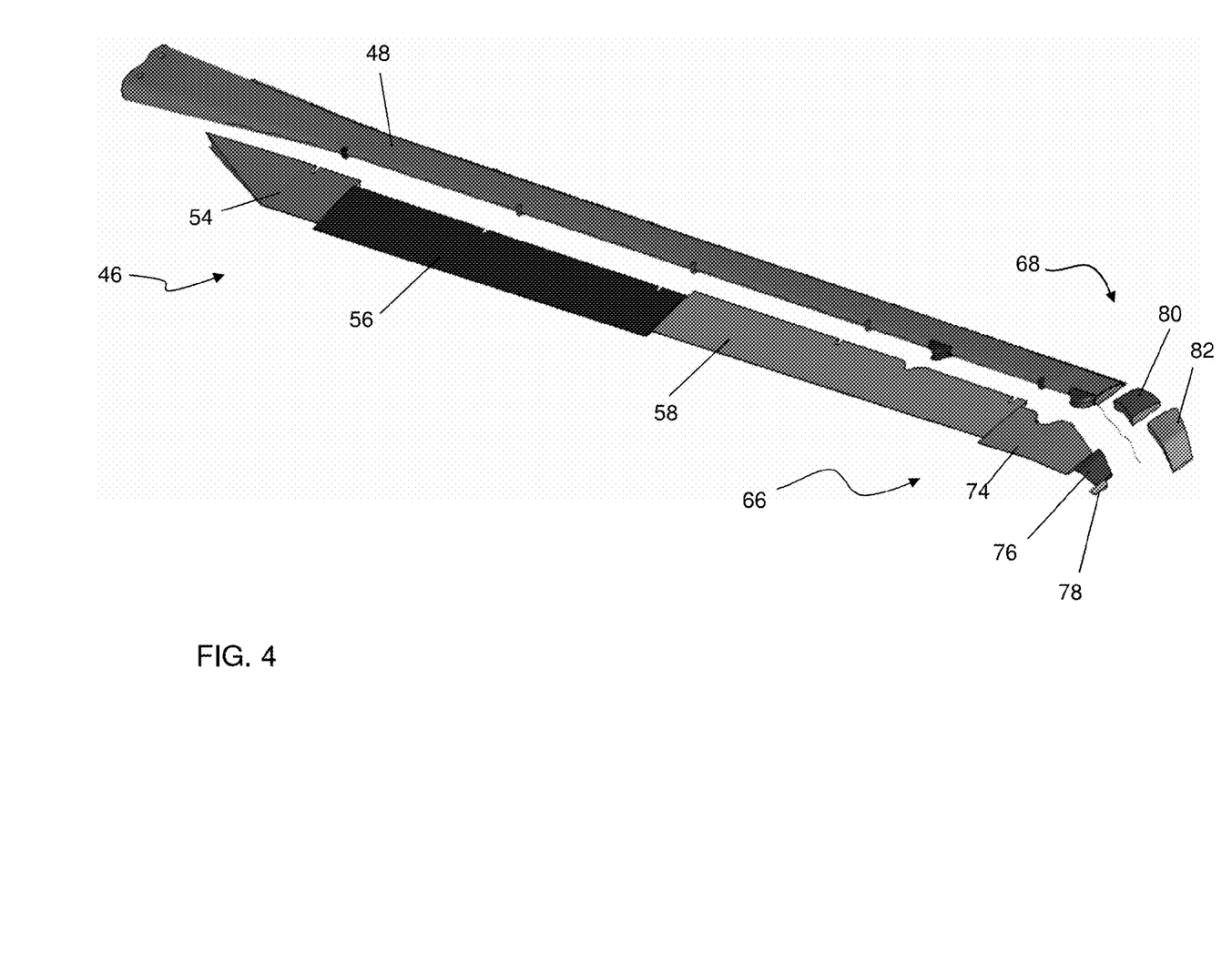
FIG. 4 is a perspective, exploded view of the main core, spar, main tip core, and tip end pocket core, of the rotor blade of FIG. 3.

As illustrated in FIG. 4, A first main tip core piece 74, positioned adjacent the main core 46, may be formed from a polyamide honeycomb core having a low density. A second main tip core piece 76, located next to the first main tip core piece 74, may be formed from a polyamide honeycomb core having a medium density, similar to the first piece 54 of the main core 46. A substantially smaller, third main tip core piece 78 is arranged next to the second main tip core piece 76, opposite the first main tip core piece 74. In one embodiment, the third main tip core piece 78 is formed from a glass honeycomb core having a high density in the range of about 5.1 pounds per cubic foot to about 10 pounds per cubic foot.

The tip end pocket core 68 is substantially aligned with a longitudinal axis of the spar 48 and is positioned in contact with the outboard end of the spar 48. Similar to the main core 46 and the main tip core 66, the tip end pocket core 68 may include multiple pieces having different sizes and core densities to provide particular lift and strength properties. In the illustrated non-limiting embodiment, the tip end pocket core 68 includes a first tip end pocket core piece 80 and a second tip end pocket core piece 82, both of which are formed from a glass honeycomb core having a high density. As such, the tip end pocket core 68 uses a higher density core as compared to other cores used on the main core 46. Together, the main tip core 66 and the tip end pocket core 68 define the anhedral form or other angled forms such as cathedral, gull, bent, and others. One or more pieces of the main tip core 66 and/or the tip end pocket core 68 may be hot formed to create a form having a desired shape. It is understood that the specific number of core pieces and densities thereof can be adjusted in other embodiments of the main tip core 66 and tip end pocket core 68 depending on the loads being generated at the rotor blade tip section 26 and tip assembly 42.

The tip cap 28 generally surrounds a portion of the main tip core 66 and a portion of the tip end pocket core 68 to form an outboard end of the tip assembly 42. The tip leading edge assembly 70 may also include a splice cap laminate 84 and a tip erosion strip 86 configured to provide abrasion protection. The splice cap laminate 84 is configured to abut at least a portion of the main sheath laminate 60. The tip erosion strip 86 may be configured to overlap the splice cap laminate 84 to protect the interface between the tip end pocket core 68 and the tip cap 28. An erosion cap 88 may overlap a portion of the tip cap 28 as well as a portion of either the splice cap laminate 84 or the tip erosion strip 86. The tip erosion strip 86 and/or the erosion cap 88 may include AM355, titanium, nickel, or a variety of other wear-resistant materials or combinations thereof.

A contiguous composite upper skin laminate 44 and lower skin laminate 50 extend from the root section 22 through the tip section 26 of the rotor blade 20 to define the aerodynamic profile of the blade 20. The composite skins 44, 50 are generally formed from several plies of prepreg composite material of a type known to those skilled in the art, such as woven graphite, carbon, or fiberglass material embedded in a suitable resin matrix for example. The composite skins 44, 50 may include uni and woven materials that are constructed and cured as a major single final laminate through the total span of the rotor, from the inboard area past the tip end outboard anhedral region. The ply orientation, material, and thickness of the upper and lower skins 44, 50 is selected to achieve a load strength suitable for a given flight condition. These continuous skins 44, 50 are mounted to the spar 48, main core 46, main tip core 66, and tip end pocket assembly 68. The cores 46, 66, 68 function as an extension of the spar 48, such that a load applied to the blade 20 is distributed by the skins 44, 50 across the spar 48 and cores 46, 66, 68. Separate main skins and tip skins are not utilized. In the illustrated, non-limiting embodiment, the upper skin 44 and the lower skin 50 extend from the root section 22 to the outboard end of the main tip core 66 and tip end pocket core 68.

Because the composite laminate skins 44, 50 are load bearing, the skins 44, 50 are substantially thicker than those used in previous rotor blades. Previously, skins had a thickness of about 0.025 inches. At least a portion of skins 44, 50, such as adjacent the tip 26 for example, may have a thickness about ten times the thickness of the previous skins. As a result of this increase in the thickness, the load carried by the skins 44, 50 at the outboard end of the blade 20 is significantly improved. In one embodiment, the thickness of the upper and lower skins 44, 50 is designed such that each skin carries about 5% of a load applied to the intermediate section 24 of the rotor blade 20 and each skin carries about 45% of a load applied to the tip 26 of the rotor blade 20. However, it is understood that the skins 44, 50 need not be load bearing in all aspects, and that other materials could be used to maintain the thicknesses while allowing the skins 44, 50 to maintain the load bearing capacity in other aspects.

Figure 5:
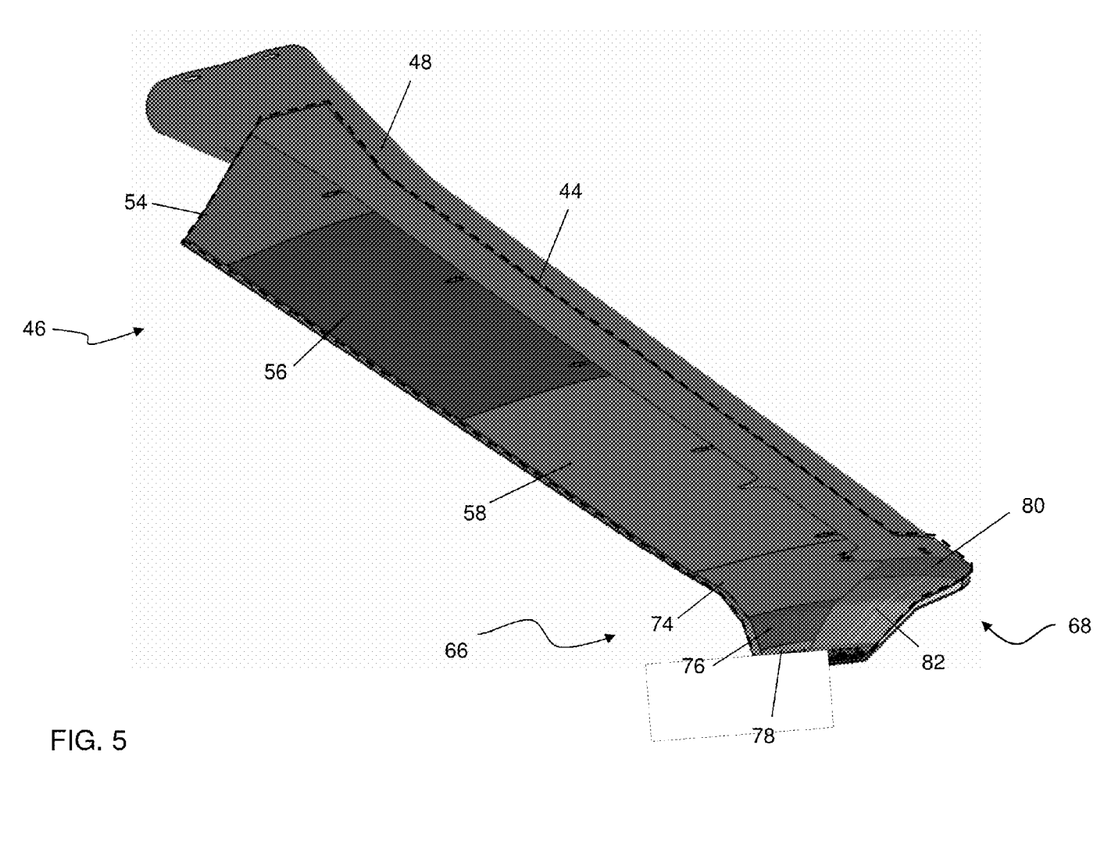
FIG. 5 is a perspective view of a partially assembled main rotor blade according to an embodiment of the invention.

To assemble a main rotor blade 20, core pieces 54, 56, 58 are bonded together, such as with an epoxy or adhesive for example, to form the main core 46. The main tip core pieces 74, 76, 78 are bonded to form the main tip core 66 and the tip end pocket core pieces 80, 82 are similarly bonded to form the tip end pocket core 68. The upper skin 44, illustrated by a dotted line in FIG. 5, is then bonded to the cores 46, 66, 68 using a high strength adhesive, such as an epoxy film for example. Once the cores 46, 66, 68 are securely connected to the skins 44, 50, they are machined along the chord of the blade to a desired size and shape. The cores 46, 66, 68 and skins 44, 50 are then assembled onto the central spar 48 including the leading edge assembly 52. A mold may be used to locate the cores 46, 66, 68 in secure alignment with the spar 48 while the adhesives of the blade 20 are cured. The tip cap 28 and tip leading edge assembly 70 are then installed over the tip end pocket core 68 connected to the spar 48.

The tip end pocket core 68 of the tip assembly 42 eliminates the need to fabricate and maintain a separate set of attached tip skins. As a result, the method of manufacturing the rotor blade 20 is simplified and the cost of the rotor blade 20 is generally reduced as compared to the attachment proposed in U.S. Pat. No. 8,353,673. In addition, because the high density core used to form the main tip core 66 and the tip end pocket core 68 is supported by the thick laminate skins 44, 50, the load applied to the blade 20 at the tip section 26 is distributed by the skins 44, 50 across the blade 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown with an integrated cuff as the root section 22, it is understood that aspects of the invention can be used with other types of root sections, such as root end cuff that is attached to the main rotor spar through a multiple fastener configuration, each fastener of which must be torqued to a required standard. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A main rotor blade assembly comprising:
   a spar having a main section;
   a main core positioned adjacent a trailing side of the main section of the spar;
   a tip assembly including a main tip core and a tip end pocket core, the tip assembly being positioned adjacent an outboard end of the main core and the spar such that the main tip core is substantially aligned with a longitudinal axis of the main core and the tip end pocket core is substantially aligned with a longitudinal axis of the spar, wherein at least a portion of both the main tip core and the tip end pocket core comprises a high density core; and
   an upper composite skin and a lower composite skin, wherein both the upper composite skin and the lower composite skin extend over the spar, the main core, the main tip core, and the tip end pocket core, and at least a portion of the upper composite skin and the lower composite skin has a thickness sufficient to be load bearing.

2. The main rotor blade assembly according to claim 1, wherein the spar is configured to directly connect to a rotor hub.

3. The main rotor blade assembly according to claim 1, wherein the high density core has a density in the range of about 5.1 pounds per cubic foot and about 10.0 pounds foot.

4. The main rotor blade assembly according to claim 3, wherein the tip end pocket core includes a first tip end pocket core piece and a second tip end pocket core piece.

5. The main rotor blade assembly according to claim 4, wherein both the first tip end pocket core piece and the second tip end pocket core piece are fabricated from a glass honeycomb core.

6. The main rotor blade assembly according to claim 5, wherein both the first tip end pocket core piece and the second tip end pocket core piece are fabricated from a high density core.

7. The main rotor blade according to claim 3, wherein the main core includes a polyamide honeycomb core having a density less than or equal to portion of high density core.

8. The main rotor blade according to claim 3, wherein the main core includes a first main core piece, a second main core piece, and a third main core piece.

9. The main rotor blade according to claim 7, wherein the first main core piece includes a medium density core having a density in the range of about 2.1 pounds per cubic foot to about 5.0 and the second main core piece and the third main core piece include a low density core having a density in the range of about 1.0 pounds per cubic foot to about 2.0 pounds per cubic foot.

10. The main rotor blade according to claim 3, wherein the main tip core assembly is positioned directly adjacent the main core and the tip end pocket core.

11. The main rotor blade according to claim 10, wherein the main tip core includes a polyamide honeycomb core and a glass honeycomb core.

12. The main rotor blade according to claim 11, wherein the main tip core includes a first main tip core piece, a second main tip core piece, and a third main tip core piece.

13. The main rotor blade according to claim 12, wherein the first main core piece includes a medium density having a density in the range of about 2.1 pounds per cubic foot to about 5.0 pounds per cubic foot, the second and third main core piece includes a low density core having a density in the range of about 1.0 pounds per cubic foot to about 2.0 pounds per cubic foot.

14. The main rotor blade according to claim 1, wherein each of the upper composite skin and the lower composite skin have a thickness sufficient to carry about 45% of a load applied to a tip of the main rotor blade.

15. The main rotor blade according to claim 1, wherein both the upper composite skin and the lower composite skin are fabricated from a composite material including at least one of graphite and fiberglass fibers.

16. A method of assembling a main rotor blade comprising:

forming a main core, main tip core, and tip end pocket core using at least one composite material;

connecting an upper skin and a lower skin to the main core, main tip core, and tip end pocket core, the upper skin and the lower skin having a thickness sufficient to be load bearing;

machining the main core, main tip core, and tip end pocket core, to a desired size and shape; and positioning the upper skin, lower skin, main core, main tip core, and tip end pocket core adjacent a rigid spar such that the main tip core and tip end pocket core extend from the rigid spar.

17. The method according to claim 16, wherein the main core is formed by bonding together a first main core piece, a second main core piece, and a third main core piece.

18. The method according to claim 16, wherein the main tip core is formed by bonding together a first main tip core piece, a second main tip core piece, and a third main tip core piece.

19. The method according to claim 16, wherein the tip end pocket core is formed by bonding together a first tip end pocket core piece and a second tip end pocket core piece.

20. The method according to claim 16, further comprising curing the spar, upper skin, lower skin, main core, main tip core, and tip end pocket core.

21. The method according to claim 16, further comprising positioning a tip cap over an end of the upper skin and lower skin, tip end pocket core assembly and the main tip core assembly.

22. The method according to claim 21, further comprising positioning a tip leading edge assembly over a leading edge of the spar, the tip leading edge assembly being configured to overlap a portion of the tip cap.

23. The method according to claim 16, wherein:
the main core has a first core density,
the main tip core has a second core density,
the tip end pocket core has a third core density, and
the third core density is greater than the first and second core densities.

* * * * *